(12) United States Patent
Iwasaki et al.

(10) Patent No.: US 7,167,358 B2
(45) Date of Patent: Jan. 23, 2007

(54) INFORMATION TERMINAL APPARATUS

(75) Inventors: Yuuki Iwasaki, Tokyo (JP); Akira Sato, Tokyo (JP); Masayasu Watanabe, Tokyo (JP); Keisuke Kawamura, Tokyo (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 10/751,431

(22) Filed: Jan. 6, 2004

(65) Prior Publication Data
US 2004/0191614 A1 Sep. 30, 2004

(30) Foreign Application Priority Data
Jan. 16, 2003 (JP) .............................. 2003-008693

(51) Int. Cl.
*G06F 1/16* (2006.01)
(52) U.S. Cl. ..................... 361/683; 361/681; 248/917
(58) Field of Classification Search .................. 429/96, 429/123, 343.1; 361/679–686; 248/917–921; 312/223.1, 223.2
See application file for complete search history.

(56) References Cited

U.S. PATENT DOCUMENTS

| 5,175,672 | A | * | 12/1992 | Conner et al. ............... 361/680 |
| 5,247,285 | A | * | 9/1993 | Yokota et al. ............... 361/680 |
| 5,260,885 | A | * | 11/1993 | Ma .............................. 361/681 |
| 5,594,617 | A | * | 1/1997 | Foster et al. ................ 361/683 |
| 5,642,258 | A | * | 6/1997 | Barrus et al. ............... 361/683 |
| 6,002,583 | A | * | 12/1999 | Shoji et al. ................. 361/683 |
| 6,411,288 | B1 | * | 6/2002 | Min ............................. 361/681 |
| 6,452,795 | B1 | * | 9/2002 | Lee ............................. 361/686 |

FOREIGN PATENT DOCUMENTS

| DE | 200 15271 U1 | 2/2001 |
| JP | 11-237929 | 8/1999 |

* cited by examiner

*Primary Examiner*—Lisa Lea-Edmonds
(74) *Attorney, Agent, or Firm*—Oblon, Spivak, McClelland, Maier & Neustadt, P.C.

(57) ABSTRACT

In an information terminal apparatus 1 having a thin housing structure including at least a display (not shown), the information terminal apparatus being driven by batteries 102, a battery pack 10 to accommodate therein the batteries 102 includes a rotary support mechanism for rotating the battery pack 10 about the intermediate portion of the rear wall side 1d of this display so that the battery pack becomes freely openable and closable from the lower portion of the rear wall side 1d of this display, wherein the rotated battery pack 10 is used as a stand to enable this display to rise to the erect position and the battery pack 10 is directly exposed to the air.

5 Claims, 11 Drawing Sheets

INFORMATION TERMINAL APPARATUS

BACKGROUND OF THE INVENTION

1. Field of the Invention

The present invention relates to an information terminal apparatus having a small, light and thin housing structure such as a mobile phone and a personal digital assistant including a flat-panel display (FDP) such as a liquid-crystal display (LCD) and which can be driven by batteries and a portable television receiver with a flat-panel display.

2. Description of the Related Art

As an information terminal apparatus including a flat-panel display such as a liquid-crystal display and which can be driven by batteries, various kinds of devices such as a mobile phone, an information terminal apparatus and a portable television broadcasting receiver with a flat-panel display have been created so far and are now commercially available on the market. As a mechanism for attaching and holding a battery pack to accommodate therein batteries, it has been customary to use a structure to insert a battery pack into a battery pack compartment from one side wall of the apparatus, a battery cover being attached to the battery pack compartment.

For example, FIG. 1 shows an example of an information terminal apparatus according to the related art. A monitor apparatus, generally depicted by reference numeral 100 in FIG. 1 is an information terminal apparatus including a display. The monitor apparatus 100 accommodates a battery pack 101 into the nearby portion of the center of a rear wall 100*d* and a battery cover 104 is attached to the battery pack 101. The monitor apparatus 100 further includes a U-shaped stand 110 attached to a rotary shaft (not shown) so as to become openable and closable (rotatable) freely about the rotary shaft. When this monitor apparatus 100 is in use, the stand 110 is pulled out of a stand compartment groove portion (not shown) and stretched with a predetermined angle to enable the monitor apparatus 100 to rise to the erect position.

FIG. 2 shows the monitor apparatus 100 with the battery cover 104 being removed. As shown in FIG. 2, when the battery cover 104 is removed from a rear wall 100*d*, a battery pack compartment recess 103 is formed in the inside of the rear wall 100*d* and the battery pack 101 is inserted into the battery pack compartment recess 103, the battery cover 104 being attached to the battery pack compartment recess 103 from above. In FIG. 2, reference numeral 102 denotes each cell of the batteries accommodated within the battery pack 101.

When it is intended to realize an information terminal apparatus with multifunction, in order to solve a problem of freedom in design, there has been proposed an information terminal apparatus having a structure in which a battery pack compartment is formed at, for example, the center of the rear wall portion of the apparatus to accommodate therein the battery pack (see cited patent reference 1).

[Cited Patent Reference]:

Japanese laid-open patent application No. 2002-169630

Batteries for use in driving the information terminal apparatus and the like as mentioned above are typically secondary batteries such as lithium ion cells and fuel cells such as hydrogen-occluded fuel cells. When these batteries are charged and discharged, they inevitably generate heat. When temperature of the secondary battery rises due to the thus generated heat or when the secondary battery is kept in the high temperature state, this becomes a significant factor to promote an electric capacity charging recovery rate of battery to be lowered.

At present, when a battery-driven information terminal apparatus is realized, a flat-panel display consumes a large amount of electric power, and a power consumption of the whole of the system of the information terminal apparatus is large because a CPU (central processing unit) and a DSP (digital signal processor) used therein become higher in performance and are driven at higher frequencies. As a consequence, the whole of the information terminal apparatus needs very large electric power. In order for the information terminal apparatus including at least the above-described flat-panel display to browse contents such as television broadcasting data having a large amount of data and which requires high brightness, such apparatus needs a battery pack mounted thereon to supply a large amount of electric current.

Problems that encountered with the information terminal apparatus when the related-art battery pack is in use are heat generated from cells when the cells are charged and discharged and heat generated from respective assemblies and elements provided within the housing including the battery pack. While most of electronic assemblies have operation guaranteeing temperature of approximately 70° C., the cell located within the battery pack is one of the parts of the assemblies of the information terminal apparatus that should be held at temperature close to ordinary temperature.

It has been customary that the operation guaranteeing temperature and the life guaranteeing temperature of the cell are set to 45° C. when it is charged and set to 60° C. when it is discharged. Having considered these aspects, it is to be noted that the package of the battery pack should be kept at temperature slightly lower than those operation guaranteeing temperature and life guaranteeing temperature (ideal temperature at which the battery pack is in use is approximately 25° C. Therefore, the package of the battery pack should be kept at this proper temperature. Otherwise, the life span of the battery is decreasing progressively and finally the battery itself becomes unable to function.

As methods for solving these problems, there are considered various methods such as partial heat transferring methods using a heat sink and a heat pipe made of metal parts, an air heat transferring method in which an apparatus includes a metal housing to conduct heat to the whole of the metal housing, a forced-cooling method using a housed fan, a water-cooling cooling method using a coolant, etc.

Of these methods, the metal assembly becomes an unnecessary antenna required when the information terminal apparatus is an information terminal apparatus capable of making wireless communication. Since this metal assembly causes significant wireless communication interference, this metal assembly is difficult to use and is disadvantageous from a weight standpoint. This applies for the case of the water-cooling cooling method using the coolant as well. Furthermore, since the fan generate undesired sounds, it is not preferable to use it in a portable device, and it is not easy to effectively mount the fan into a small, light and thin housing.

As an information terminal apparatus that receives a remarkable attention from a standpoint of heat problem at present, there are roughly classified three types of information terminal apparatus such as a housing type high-speed communication apparatus such as a notebook type PC (personal computer) and a server, an apparatus such as a television receiver needing large electric power to display images and a wireless communication apparatus such as a mobile phone designed so as to consume lesser electric power and which can be driven by batteries. Therefore, heat should be transferred from the battery pack to the outside while all problems, such as removal of undesired sounds, light and thin information terminal apparatus and highly-sensitive wireless communication, which encountered with these three types of the information terminal apparatus, should be solved.

However, although the information terminal apparatus of the type to house therein the battery pack that has been described in the cited patent reference 1 can improve freedom in designing the information terminal apparatus when this information terminal apparatus mounts the battery pack, improvement of heat transferring effect of the battery pack is not taken into consideration. As a result, since the battery pack is accommodated within the housing of the information terminal apparatus, it is unavoidable that heat generated from the battery, heat generated from the display and heat generated from an electric circuit such as an IC (integrated circuit) are confined within the housing of the information terminal apparatus.

FIG. 3 is a cross-sectional view taken along the line A—A in FIG. 2 and shows the marginal portion of the battery pack portion. As shown in FIG. 3, the battery pack 101 is accommodated within the battery pack compartment recess 103 formed on the rear wall 100d of the monitor apparatus 100 and the battery pack 101 is covered with a battery cover 104. As shown by an open arrow 120, the battery pack 101 is not exposed to the air unless the battery cover 104 is removed from the battery pack 101, and is affected by heat generated from an electric circuit (not shown) and the like within the monitor apparatus 100 as shown by solid arrows 121 in FIG. 3.

Under those circumstances, not only other cooling apparatus becomes necessary in order to hold the cells at proper temperature but also it becomes difficult to solve these problems because of various factors such as the weight of the information terminal apparatus, the trouble of wireless communication and the safety of the information terminal apparatus. In consequence, a disadvantage unavoidably arises, in which reduction of a time period in which the battery can be used is promoted (i.e., deterioration of battery).

SUMMARY OF THE INVENTION

In view of the aforesaid aspect, it is an object of the present invention to provide an information terminal apparatus in which heat transferring effect of a battery pack of a battery-driven information terminal apparatus including at least a flat-panel display or the like can be enhanced.

According to an aspect of the present invention, there is provided an information terminal apparatus having a thin housing structure including at least a display, the information terminal apparatus being driven by batteries. This information terminal apparatus includes a battery pack to accommodate therein batteries. The battery pack includes a rotary support mechanism for rotating the battery pack about the intermediate portion of the rear wall side of the display so that the battery pack becomes freely openable and closable from the lower portion of the rear wall side of this display, and the thus rotated battery pack is used as a stand to enable this display to rise to the erect position and this battery pack is directly exposed to the air.

According to another aspect of the present invention, there is provided an information terminal apparatus having a thin housing structure including at least a display, the information terminal apparatus being driven by batteries. This information terminal apparatus includes a battery pack compartment member to which a battery pack to accommodate therein the batteries is detachably attached. The battery pack compartment member includes a rotary support mechanism for rotating the battery pack compartment member about the intermediate portion of the rear wall side of this display such that the battery pack compartment member becomes freely openable and closable from the lower portion of the rear wall side of this display. The thus rotated battery pack compartment member is used as a stand formed as one body with the battery pack to enable this display to rise to the erect position, and the battery pack is directly exposed to the air.

According to the above-mentioned present invention, since the battery pack of the information terminal apparatus having the thin housing structure is used as the stand for enabling the battery pack to rotatably open and close freely or a part of the stand so that the display can rise to the erect position, while the display can rise to the erect position stably, the package of the battery pack can directly be exposed to the air, and hence heat transferring property can be improved.

DESCRIPTION OF THE PREFERRED EMBODIMENTS

An information terminal apparatus according to the embodiments of the present invention will be described below with reference to the drawings. In the following embodiments, the present invention is applied to a monitor apparatus 1 of the system composed of the monitor apparatus 1 and a base apparatus 200 shown in FIG. 4.

Figure 4:
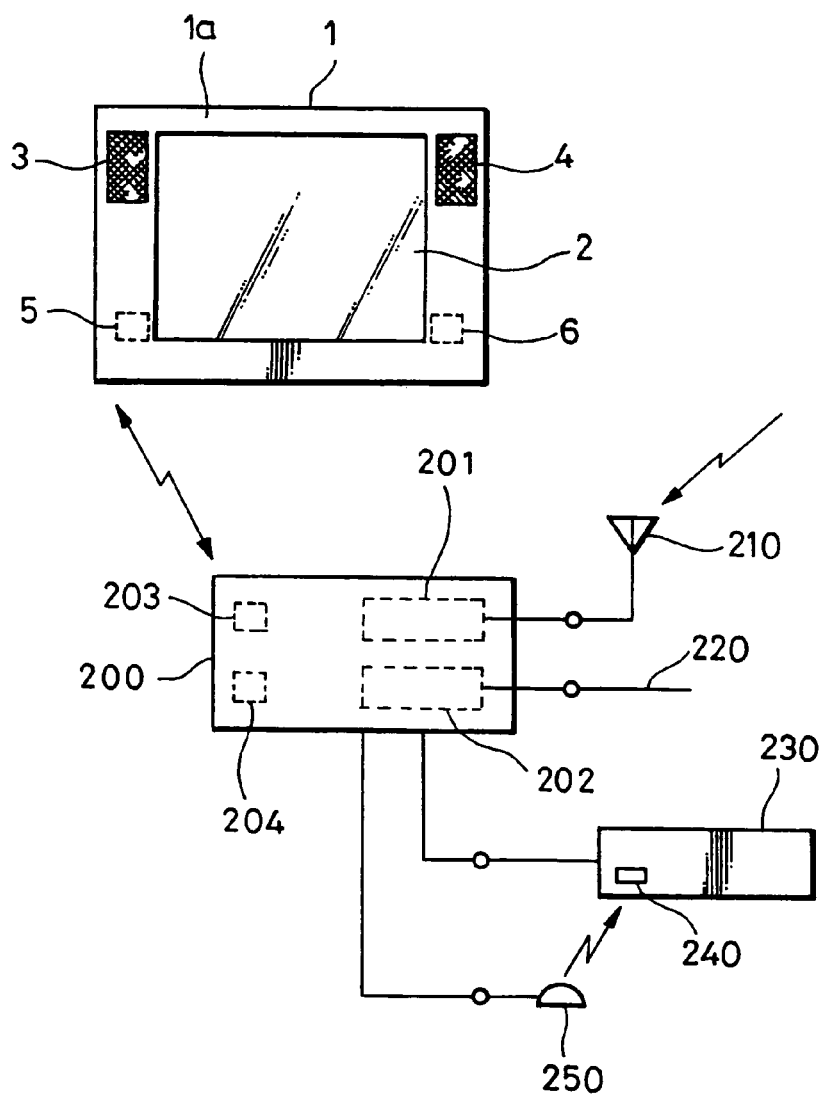
FIG. 4 is a diagram showing an example of a system using a monitor apparatus to which an information terminal apparatus according to the present invention is applied.

The system shown in FIG. 4 is a kind of a wireless LAN (local area network) constructed within a limited area such as the inside of the house and is comprised of the monitor apparatus 1 and the base apparatus 200.

The monitor apparatus 1 includes a display such as a liquid-crystal display (LCD) 2 and speakers 3, 4 mounted on its front wall portion 1a, in this embodiment. The monitor apparatus 1 further includes therein so-called patch-slot array antennas 5, 6 for use in wireless communication made between them and the base apparatus 200.

As shown in FIG. 4, the base apparatus 200 is provided with a television broadcasting reception tuner 201, a modem (modulator and demodulator) 202 and antennas 203, 204, which might be called patch-slot array antennas, for use in wireless communication between it and the monitor apparatus 1. The tuner 201 is connected to a television broadcasting reception antenna 210 and the modem 202 is connected to a telephone network line 220, whereby the monitor apparatus 1 is made able to receive television broadcasting through wireless communication made between it and the base apparatus 200, to access the Internet and to transmit and receive electronic mails.

Devices such as a video deck, a DVD (digital video disk) player and a digital CS (communication satellite) broadcasting reception tuner and a BS (broadcast satellite) digital broadcasting reception tuner can be connected to the base apparatus 200 as an external device 230, whereby the monitor apparatus 1 is made able to receive video and audio information obtained from the external device 230 through wireless communication made between it and the base apparatus 200. At the same time, a remote controller transmitter 250 such as an AV (audio-video) mouse and a remote controller light-receiving unit 240 mounted on the external device 230 can receive remote controller signal light transmitted from the remote control transmitter 250 so that the monitor apparatus 1 becomes able to control the external device 230. The remote controller used herein is adapted to remotely control various devices such as the external device 230.

According to the above-described system, while the user locates the base apparatus 200 at the stationary place such as a living room, the user carries the monitor apparatus 1 into a desired place such as somewhere of the house or garden, whereby the user becomes able to execute desired function such as receiving television broadcasting, accessing the Internet and transmitting and receiving electronic mails by means of the monitor apparatus 1 located at hand.

When the monitor apparatus 1 is in use, while the user can hold the monitor apparatus 1 with hand, the user is able to watch the LCD (display screen) 2 of the monitor apparatus 1 rising to the erect position on the proper surface at a proper inclination angle by the bottom wall of the monitor apparatus 1 and a stand, which will be described later on, after the stand has been opened.

Figure 5A:
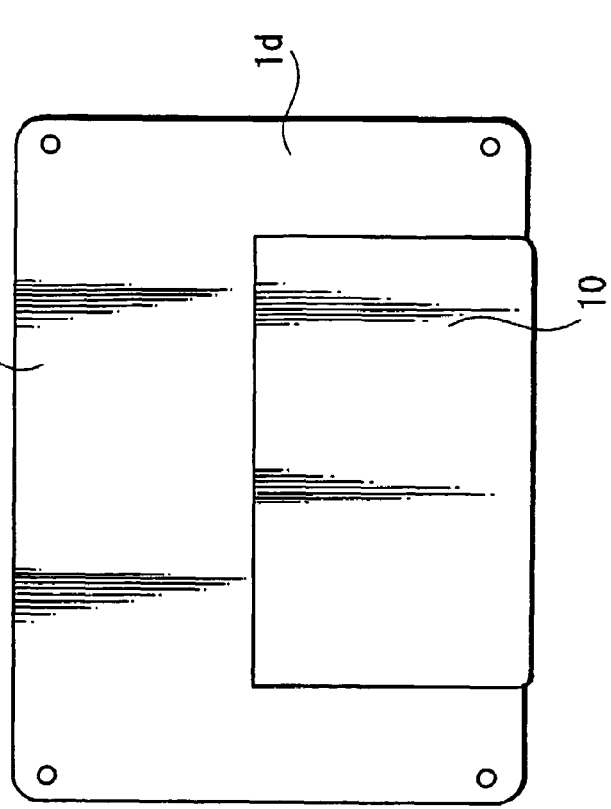
FIGS. 5A, 5B and 5C are a front view, a side view and a bottom view schematically showing an outward appearance of a monitor apparatus to which an information terminal apparatus according to the present invention is applied, respectively.
Figure 5C:
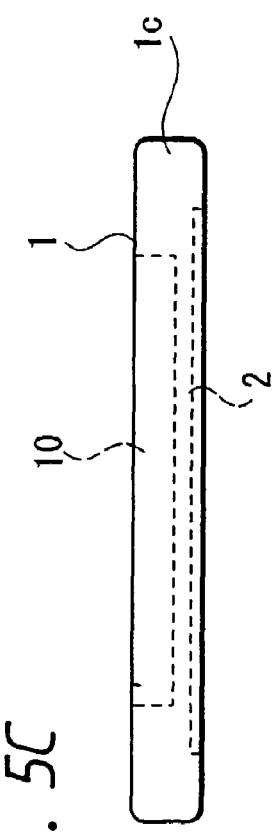
Figure 5B:
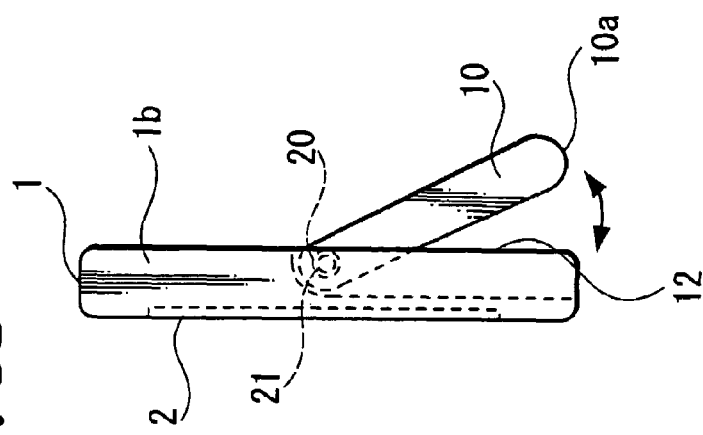

FIGS. 5A, 5B and 5C show an example of a monitor apparatus to which the information terminal apparatus of the present invention is applied, respectively. FIG. 5A is a rear view of the example of the monitor apparatus, FIG. 5B is a side view thereof, and FIG. 5C is a bottom view thereof, respectively.

As illustrated, a battery pack 10 having stand function, which will be described later on, is accommodated into the battery pack compartment groove portion 12 formed under the rear wall portion 1d of the LCD 2 of the monitor apparatus 1. This monitor apparatus 1 includes a rotary shaft 21 provided in the lateral (width) direction of the rear wall portion 1d, for example. This rotary shaft 21 is inserted into a bearing aperture 20 formed on the upper lateral direction of the battery pack 10 of the monitor apparatus 1 to construct a rotary support portion and thereby the battery pack 10 can rotate about the rotary support portion so as to become freely openable and closable. This battery pack 10 can function as the stand to enable the monitor apparatus 1 to rise to the erect position.

The front wall portion 1a and the rear wall portion 1d are joined by fixing means such as screws provided at the four corners, for example. As is disclosed in Japanese laid-open patent application No. 2002-169630, the rear wall portion 1d may have vents (not shown) formed on its respective side surfaces. The rear wall portion 1d may further have an antislipping material made of a suitable material such as rubber formed on its bottom surface. The bottom wall portion 10a of the batter pack 10 having stand function shown in FIG. 5B should preferably be designed so as to have a proper angle such that the monitor apparatus 1 can stably rise to the erect position when the battery pack is opened with an arbitrary angle.

Figure 2:
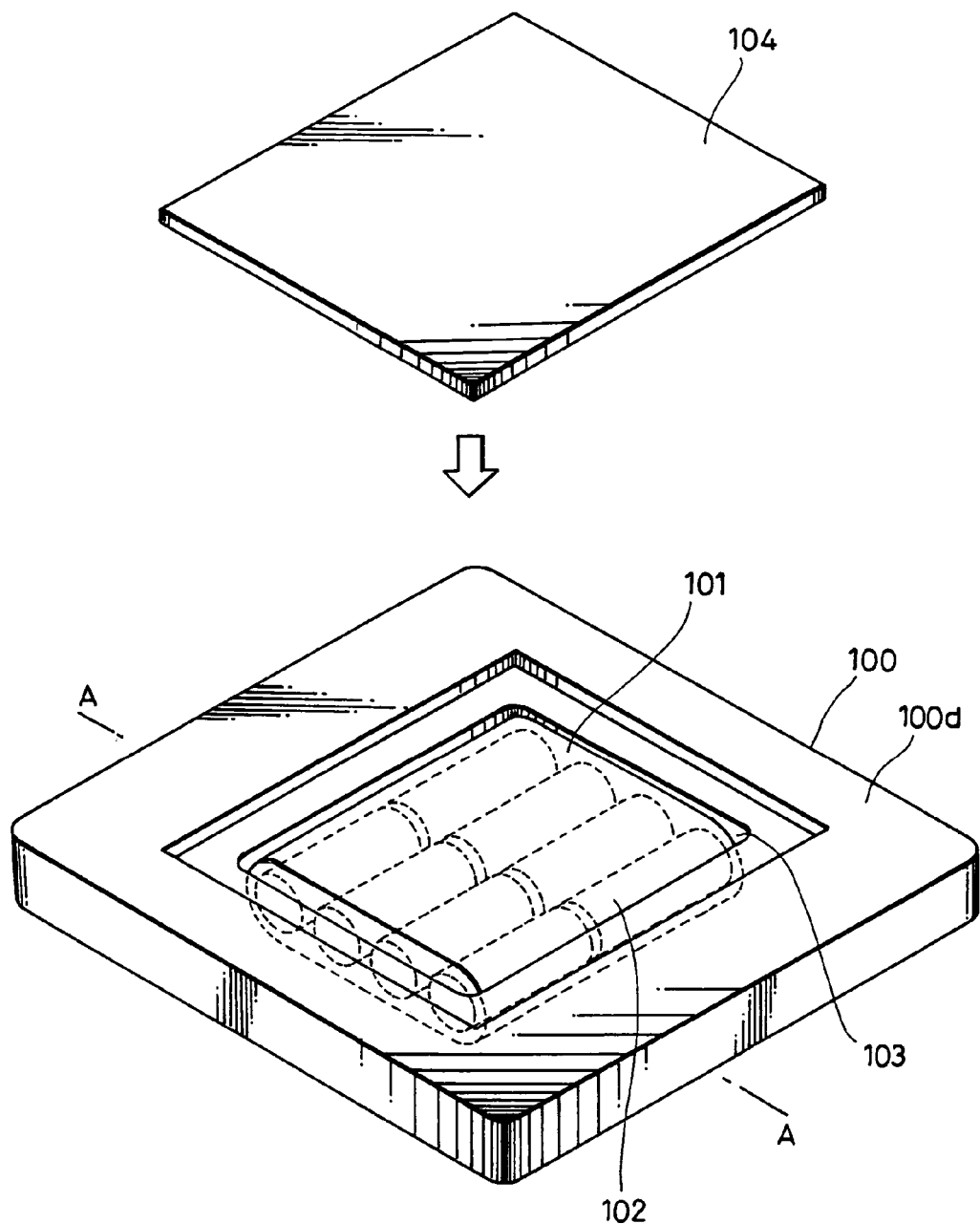
FIG. 2 is a perspective view showing an example of a battery pack compartment for use with an information terminal apparatus according to the related art.
Figure 6:
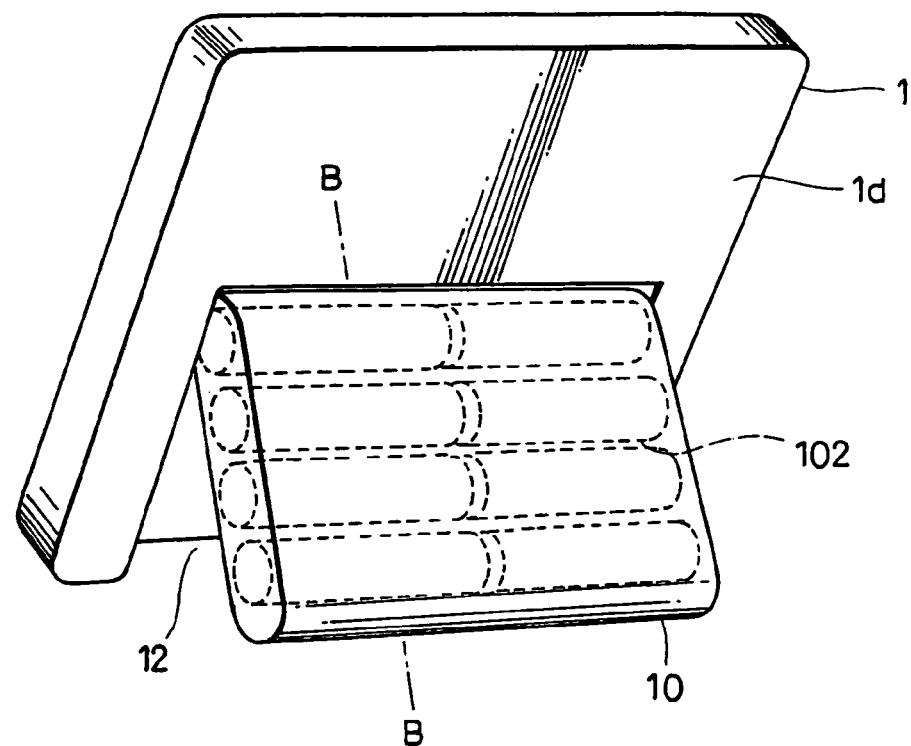
FIG. 6 is a rear perspective view showing an example of a monitor apparatus to which an information terminal apparatus according to the present invention is applied.

FIG. 6 is a rear perspective view showing an example of a monitor apparatus to which the information terminal apparatus of the present invention is applied. In FIG. 6, elements and parts identical to those of FIG. 2 are denoted by identical reference numerals. As shown in FIG. 6, the battery pack 10 is released from the battery pack compartment groove portion 12 of the rear wall portion 1b to function as a stand to enable the monitor apparatus 1 to rise to the erect position. Further, in this embodiment, the battery pack 10 includes the package 11 to accommodate the battery comprising cells 102 arrayed in four rows.

Figure 3:
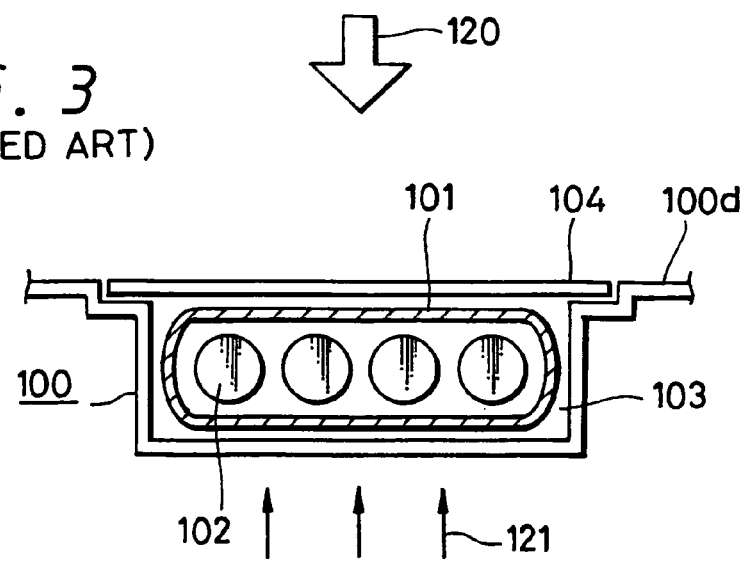
FIG. 3 is a cross-sectional view taken along the line A—A in FIG. 2.
Figure 7:
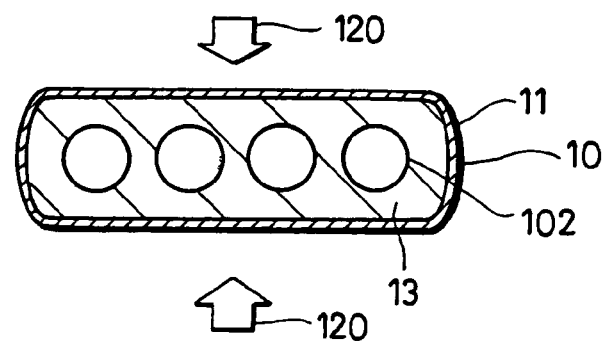
FIG. 7 is a cross-sectional view taken along the line B—B in FIG. 6.

FIG. 7 is a cross-sectional view taken along the line B—B of the battery pack 10 shown in FIG. 6. In FIG. 7, elements and parts identical to those of FIG. 3 are denoted by identical reference numerals. When the battery pack 10 functions as the stand to rotate so as to become freely openable and closable, the battery pack 10 is detached from the main body of the monitor apparatus 1 so that the upper and lower respective surfaces of the package 11 of the battery pack 10 can directly be exposed to the air.

When the monitor apparatus 1 is not in use or when the monitor apparatus 1 is placed on a proper means such as an exclusive desktop charging holder, the battery pack 10 can be closed and can be accommodated within the battery pack compartment groove portion 12. Also in this state, the battery pack 10 is constructed such that its surface opposite to the surface facing to the monitor apparatus 1 may directly be exposed to the air.

Figure 1:
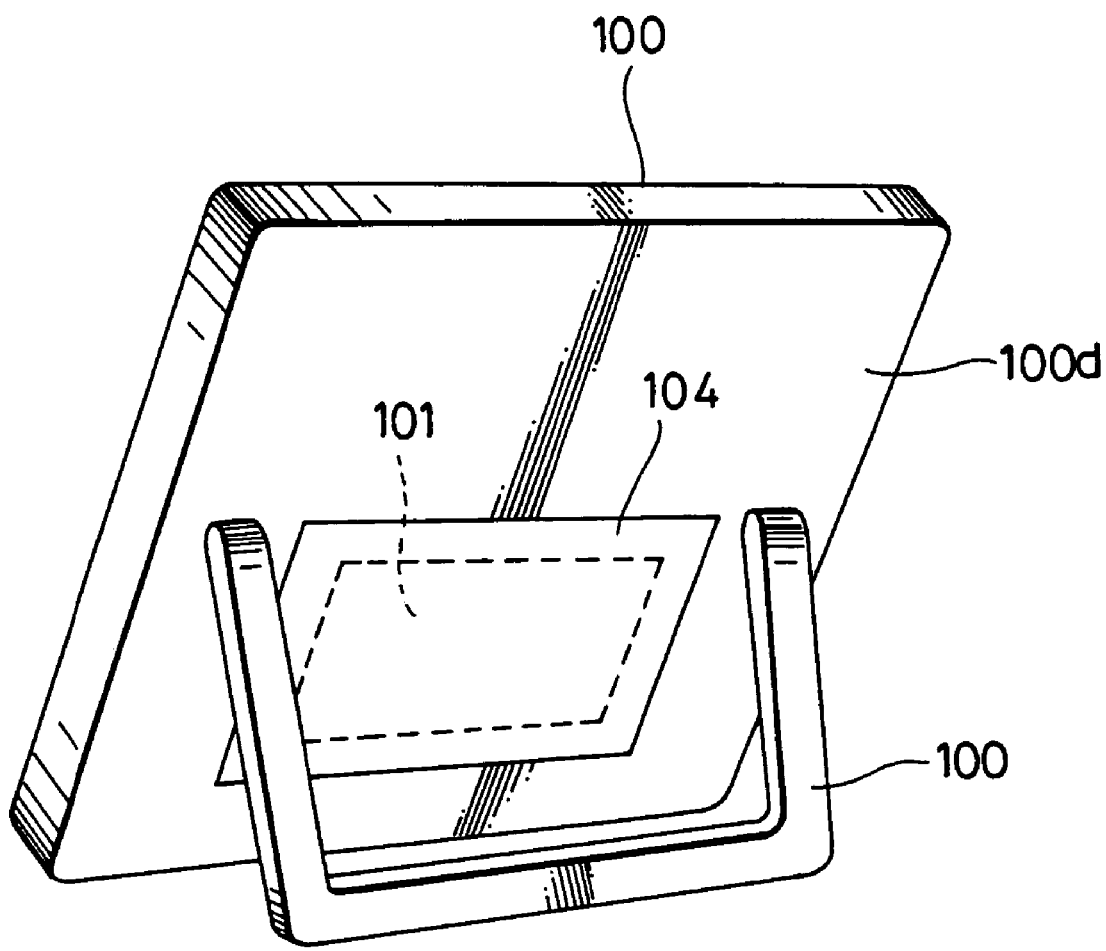
FIG. 1 is a perspective view showing an outward appearance of an example of an information terminal apparatus according to the related art.

Since the battery pack 10 that is relatively heavy in various assemblies comprising the monitor apparatus 1 is used as the stand, as compared with the light-weight stand 110 which is made of a suitable material such as a plastic material shown in FIG. 1, the position of the center of gravity of this battery pack 10 is lowered to the surface of the desktop side and the battery pack 10 can be held on the surface of the desktop stably. Furthermore, since the loads of the weight to the battery pack 10 and its rotary support portion decrease, even when the friction coefficient of the rotary support portion is small, the battery pack 10 becomes strong against vibrations and shocks and becomes difficult to fall down.

Figure 8A:
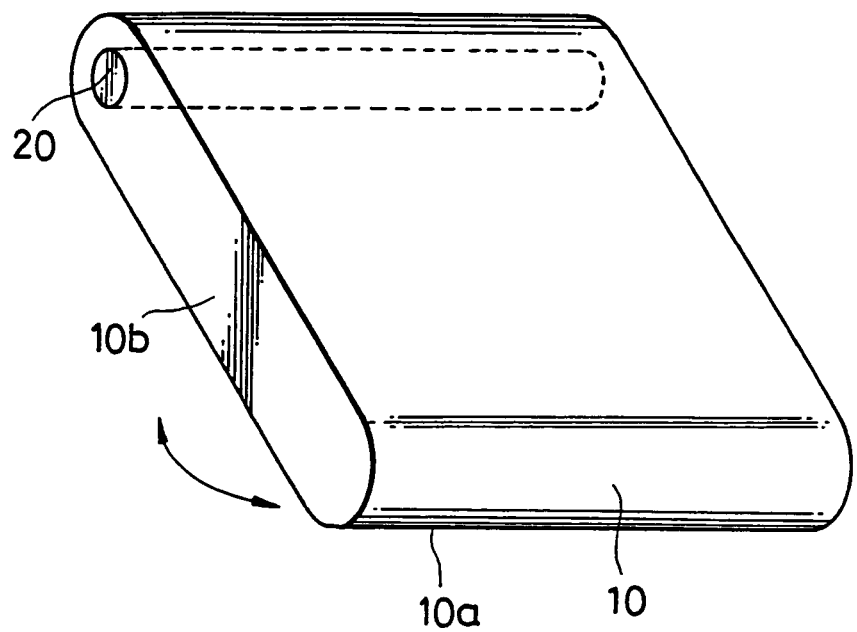
FIGS. 8A and 8B are perspective view of an outward appearance of a battery pack and shows an example of a rotary support mechanism of the battery pack shown in the example of FIG. 6, respectively.
Figure 8B:
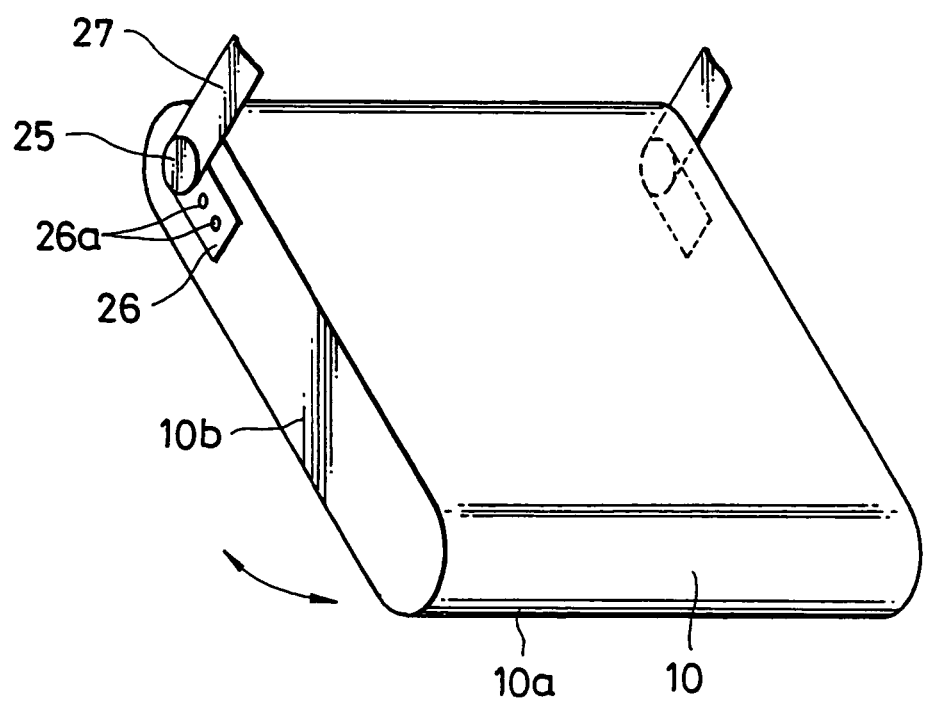

FIGS. 8A and 8B show an example of the rotary support mechanism of the battery pack 10, respectively. As shown in FIG. 8A, the battery pack 10 has a bearing aperture 20 extended in the lateral direction of the upper portion thereof. This bearing aperture 20 allows the rotary shaft 21 provided on the side of the monitor apparatus 1 shown in FIG. 5B to pass therethrough, and the battery pack 10 rotates about this rotary shaft 21 so as to become freely openable and closable from the monitor apparatus 1. This bearing aperture 20 is not limited to the bearing aperture and may variously be modified depending upon a relationship between it and the rotary shaft 21.

Since the rotary shaft 21 and the bearing aperture 20 are brought in slidable contact with each other with a proper torque of rotation, when the battery pack 10 is set at a desired angle within an expanded angular extent, this monitor apparatus 1 and the battery pack 10 having the stand function may be held at the thus set angular position.

FIG. 8B shows an example in which the battery pack 10 is provided with rotary support arm portions. As shown in FIG. 8B, a first rotary support arm 26 is secured to the side wall 10b of the battery pack 10 by fixing members 26a, 26a made of suitable means such as screws and coupled to a second rotary support arm 27 through a rotation fulcrum 25. The second rotary support arm 27 is coupled to the marginal portion of the upper portion of the battery pack compartment groove portion 12, for example, i.e., the nearby portion of the intermediate portion of the rear wall side of the monitor apparatus 1. Thus, when the first rotary support arm 26 is rotated (the second rotary support arm portion 27 also may be rotated about the point in which the battery pack 10 is coupled to the monitor apparatus 1, if necessary), the battery pack 10 can rotate. Although not shown by reference numerals in FIG. 8B, this will apply for the arrangement of the side wall on the opposite side as well.

Also in FIG. 8B, when the battery pack 10 is set at a desired angle within the expanded angular extent, this monitor apparatus 1 and the battery pack 10 with the stand function can be held at the thus set angular position similarly to the above-mentioned example.

FIGS. 8A and 8B show the rotary support mechanism by way of example. The rotary support mechanism according to the present invention is not limited to the above-mentioned example, and various kinds of rotary support mechanisms may be considered by using well-known technologies.

When the battery pack 10 is used as the stand as described above, the battery pack 10 may be slightly curved as an arc at its bottom wall portion 10a, which contacts with the desktop surface, with application of the shape of the stand 110 described in Japanese laid-open patent application No. 2002-169630 and thereby the battery pack 10 may contact with the desktop surface at its two outside contact portions.

When the span between the two outside contact portions of the bottom wall portion 10a is selected to be wide enough or the length of the width direction of the bottom wall portion 10a is selected to be long enough, the monitor apparatus 1 can become difficult to be affected by vibrations and inclination of the desktop surface, and hence the monitor apparatus 1 can be held to rise to the erect position at a desired angle within the expanded angular extent of the battery pack 10. Therefore, not only reception sensitivity between the monitor apparatus 1 and the base apparatus 200 can be improved but also the display screen 2 of the monitor apparatus 1 can become easy to see and the monitor apparatus 1 can become easy to handle.

When the battery pack 10 contacts with the desktop surface at its two contact portions, the surface of the bottom wall portion 10a of the battery pack 10 can be protected from being scratched and smudged. Further, even when the battery pack 10 is curved in the width direction or in the longitudinal direction in accordance with the design of the monitor apparatus 1, since resultant protruded portions are protruded from the bottom wall portion to the outside so that they may constantly be brought in contact with the desktop surface, the battery pack 10 can cope with various designs satisfactorily.

Further, the two contact portions that are formed by curving the bottom wall portion 10a of the battery pack 10 in contact with the floor may be replaced with a pair of protruded portions (not shown) formed at the portions corresponding to the above-described contact portions, for example. Furthermore, the bottom wall portion 11b may be provided with a nonskid material such as rubber.

In this case, since the protruded portions are brought in contact with the desktop surface, the surface of the bottom wall portion 10a of the battery pack 10 can be protected from being scratched and smudged. Further, even when the battery pack 10 is curved in the width direction or in the longitudinal direction in accordance with the design of the monitor apparatus 1, since resultant protruded portions are protruded from the bottom wall portion to the outside so that they may constantly be brought in contact with the desktop surface, the battery pack 10 can cope with various designs satisfactorily. Besides, it will easily be understood that similar action and effects to those achieved when the bottom wall portion 10a of the battery pack 10 is curved to provide the two contact portions and thereby the battery pack 10 is brought in contact with the desktop surface at its two contact portions.

As described above, according to this embodiment, since the battery pack 10 is given the stand function and becomes able to rotate freely, while the battery pack 10 can stably rise to the erect position, the package 11 of the battery pack 10 can directly be exposed to the air so that heat transferring effect of the battery pack 10 of the monitor apparatus 1 having the display such as the LCD 2 and which makes wireless communication according to this embodiment can be improved.

Further, when a suitable material such as heat conducting jelly 13 for conducting heat from each cell 102 to the package 11 of the battery pack 10 is filled into the inside of the package 11 of the battery pack 10 as shown in FIG. 7, it can be expected that heat transferring effect will be improved much more. It has been customary that short-circuit will be caused within the housing due to board assemblies when the package 11 of the battery pack 10 is -made of a material having high thermal conductivity. According to the present invention, the possibility of such short-circuit is quite small, and hence much more improved heat transferring effect can be expected.

Although the layout of assemblies within the housing is limited from a standpoint of the center of gravity and from a shape standpoint because the monitor apparatus 1 includes the battery pack 10 provided within the housing in the conventional monitor apparatus, freedom in the layout of assemblies within the housing can be increased by the countermeasure of the present invention, and hence countermeasures against a problem of heat, a problem of wireless communication trouble and a problem of undesired sound can be decreased. In consequence, it becomes possible to design the information terminal apparatus having the light, compact and thin housing structure.

Further, since the battery pack 10 is used as the stand, a space necessary for accommodating an exclusive stand for use with a conventional monitor apparatus can be removed and freedom in designing the rear wall portion 1*d* within the inside of the monitor apparatus 1 can be increased, thereby achieving similar effects to those described above.

Furthermore, since the battery pack 10 is given the stand function and can rotate freely so that it can be pulled out from and accommodated into the monitor apparatus 1 freely, the compact and light monitor apparatus 1 that has been excellent from a standpoint of handling and a design standpoint so far can be maintained. Therefore, the information terminal apparatus according to the present invention can become easy to handle when it is carried as is usual or when it is held by hand in use.

Figure 9:
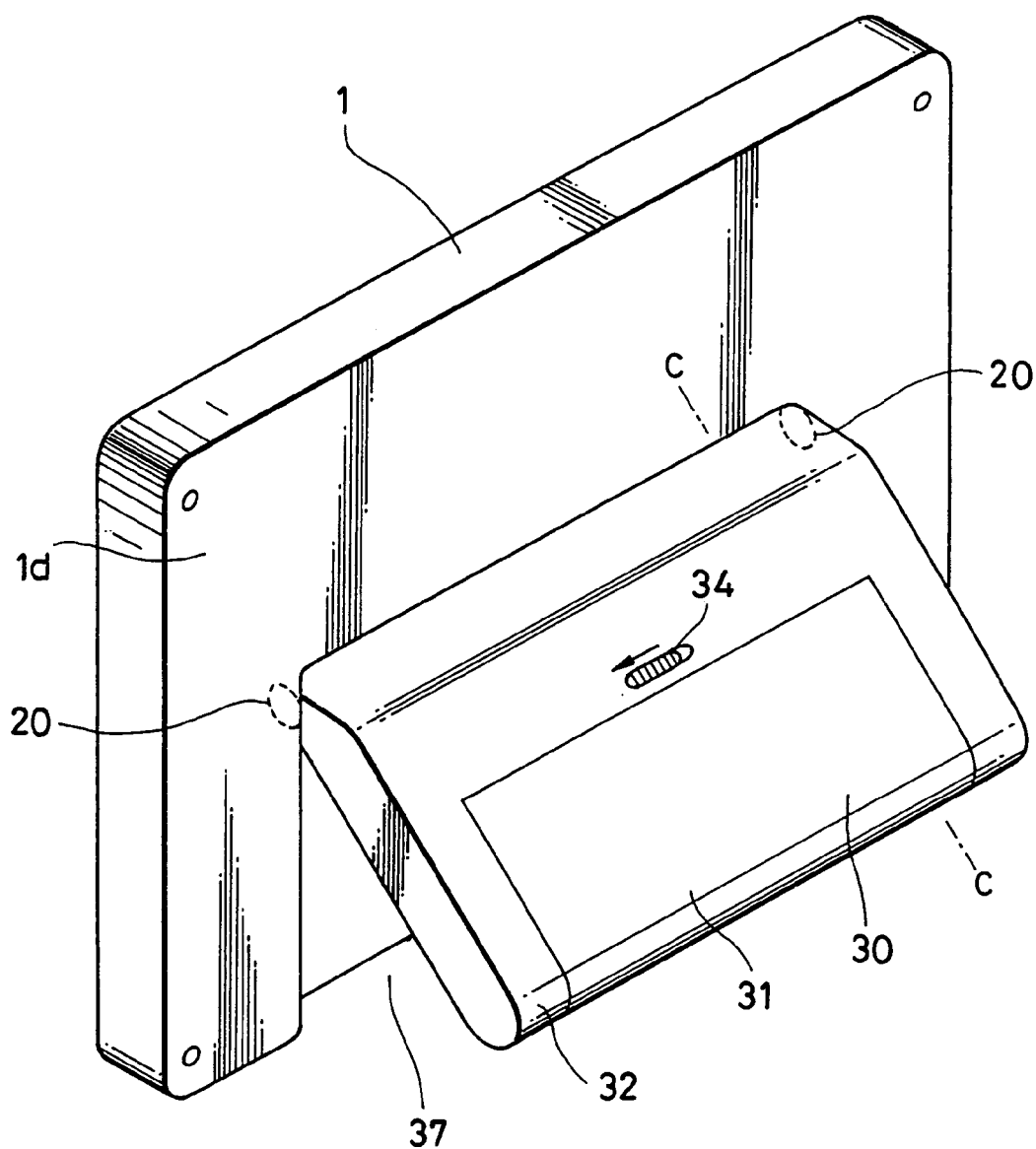
FIG. 9 is a perspective view of an outward appearance of a monitor apparatus and shows another example of the monitor apparatus to which the information terminal apparatus according to the present invention is applied.

FIG. 9 is a rear perspective view showing another embodiment of the monitor apparatus to which the information terminal apparatus according to the present invention is applied. As shown in FIG. 9, a stand 30 having a built-in battery (hereinafter simply referred to as a "battery built-in type stand") composed of a battery pack compartment member 32 with the battery pack 10 accommodated therein is opened and hence the monitor apparatus 1 stands to the erect position. In FIG. 9, elements and parts identical to those of FIG. 6 are denoted by identical reference numerals.

As shown in FIG. 9, a stand compartment member 32 comprising the battery built-in type stand 30 of the rear wall portion id has a bearing aperture 20 extended in the lateral direction of its upper portion. This bearing aperture 20 extends through a rotary shaft (not shown) provided on the side of the monitor apparatus 1 to construct the rotary support mechanism similarly to the example shown in FIG. 5B. Consequently, the battery built-in type stand 30 can rotate about this rotary shaft so as to become freely openable and closable. As shown in FIG. 9, the battery pack 31 is fixed to the battery pack compartment member 32 by a lock lever 34.

When the battery built-in type stand 30 is opened, the distance between the battery pack 31 and the main body of the monitor apparatus 1 can increase to promote transferring of heat from the battery pack 31.

Figure 10A:
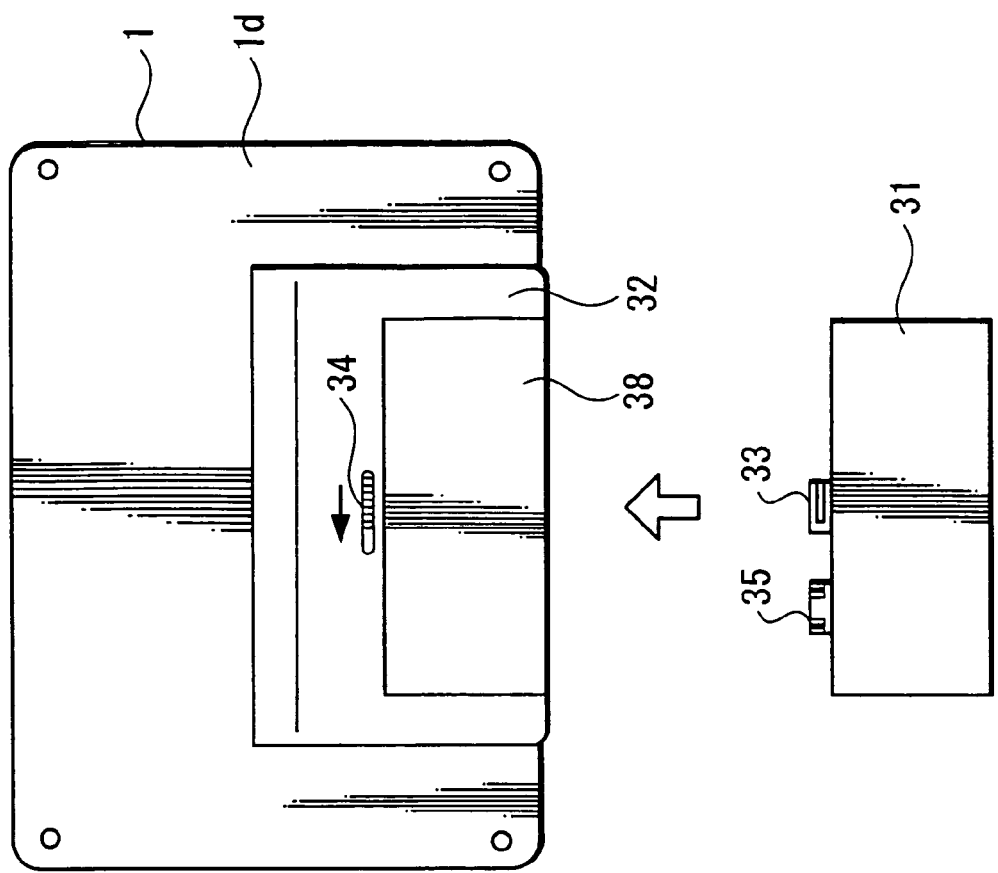
FIGS. 10A and 10B are a front view and a side view showing the front, side and bottom of a monitor apparatus and shows another example of the monitor apparatus to which the information terminal apparatus of the example of FIG. 9 is applied, respectively.
Figure 10B:
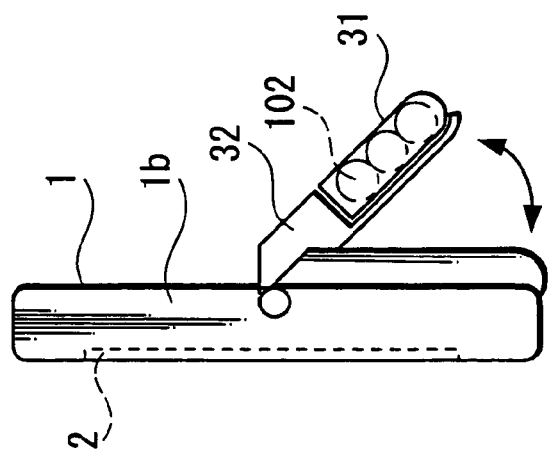

FIG. 10A is a rear view of the monitor apparatus with the battery pack removed, and FIG. 10B is a side view of the monitor apparatus. As shown in FIG. 10A, the battery pack 31 has a lock lever engagement portion 33, to be engaged with the lock lever 34, at the predetermined position of its upper end portion and a battery terminal 35. According to this embodiment, with the well-known technology, when the battery pack 31, for example, is accommodated into the battery pack compartment groove portion 38, if the lock lever 34 is slid in the lock side, then the battery pack 31 is locked to the battery pack compartment member 32.

FIG. 10B is a side view showing the state in which the battery built-in type stand 30 composed of the battery pack 31 and the battery pack compartment member 32 is closed and also shows the state in which the battery built-in type stand 30 is rotated about the rotation supporting point to open at a predetermined angular extent. The battery built-in type stand 30 is illustrated in the cross-sectional view taken along the line C—C in FIG. 9.

When the monitor apparatus 1 is not in use or when the monitor apparatus 1 is held on the exclusively-designed desktop charging holder, the battery built-in type stand 30 is closed and can be accommodated into the stand compartment groove portion 37. At that time, the battery pack 31 accommodated into the battery pack compartment member 32 is directly exposed to the air at it surface opposite to the side in which the battery pack 31 faces to the monitor apparatus 1.

Figure 11:
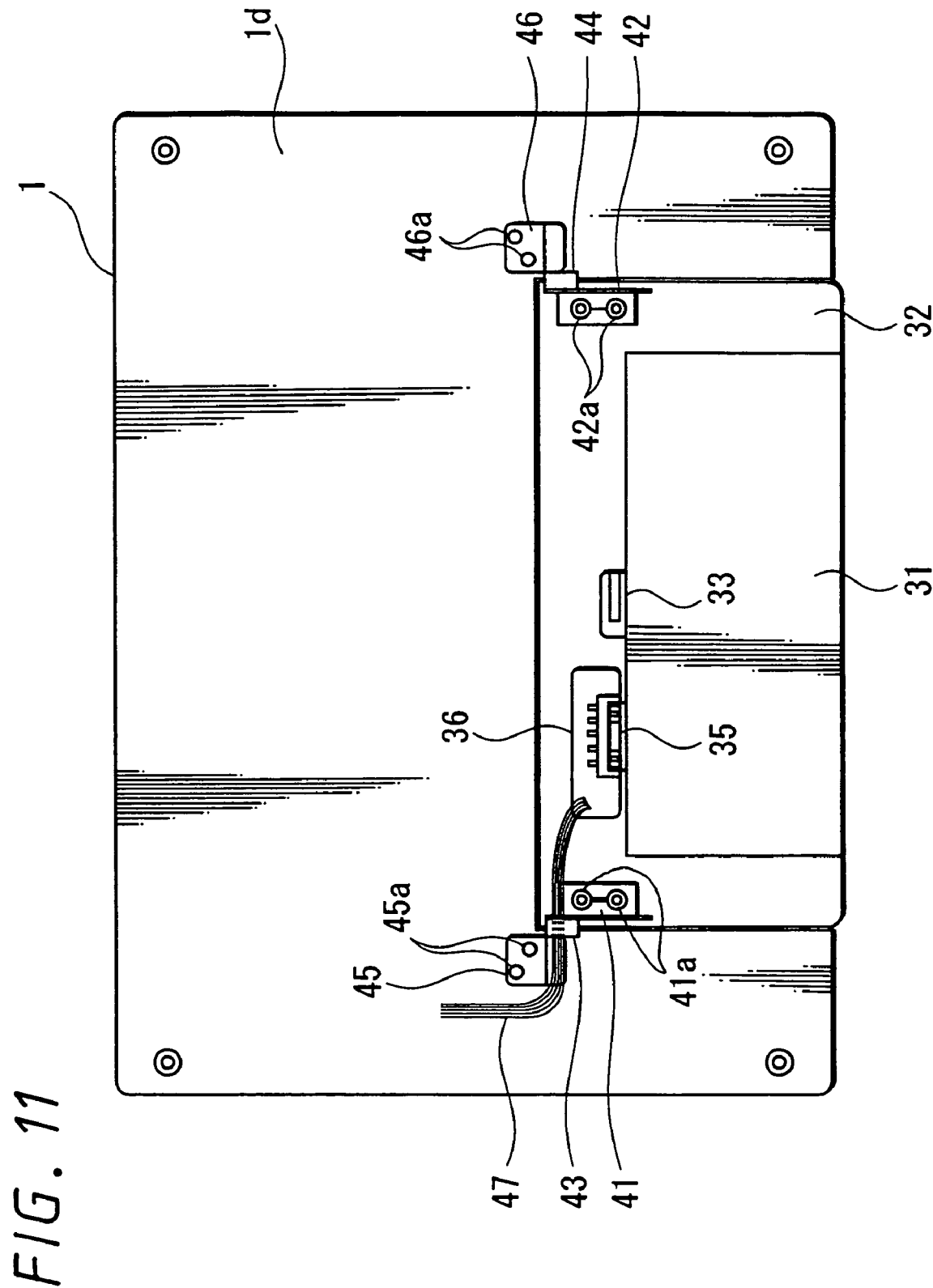
FIG. 11 is a rear view showing an example of a structure of the stand and the surrounding portion of the stand of the example shown in FIG. 9.
Figure 12A:
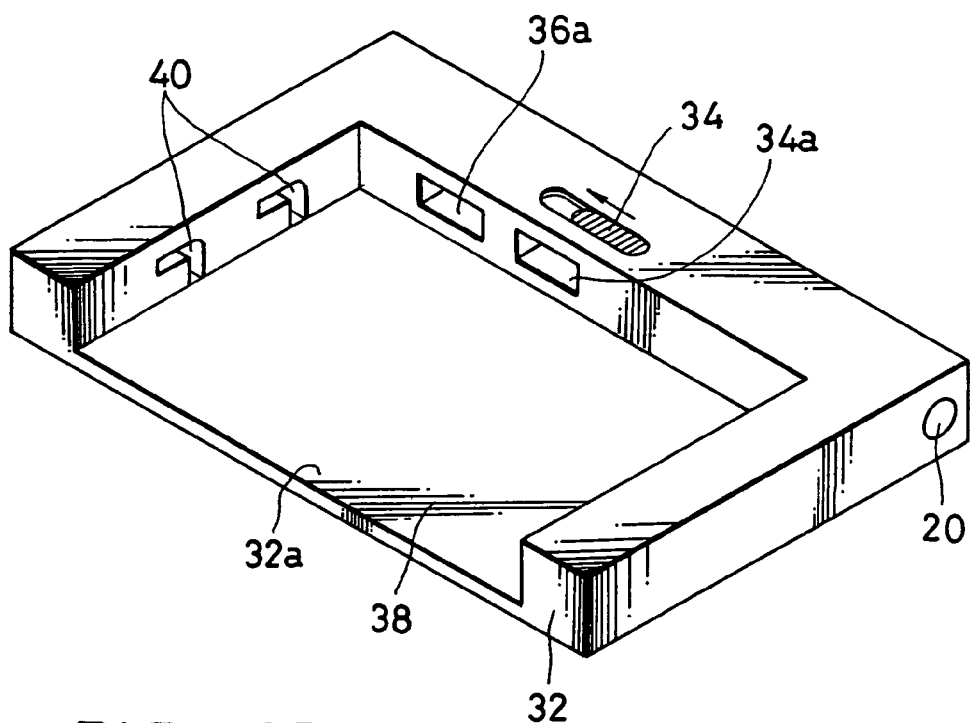
FIGS. 12A and 12B are perspective views showing an example of a battery pack compartment member shown in the example of FIG. 9, respectively.

FIG. 11 is a rear view of the monitor apparatus 1 in the example shown in FIG. 9 and also illustrates the monitor apparatus 1 in a cutaway fashion in order to explain the inside structure of the battery pack compartment member 32. In FIG. 12A, reference numerals 34*a*, 36*a* denote holes into which the lock lever engagement portion 33 and a battery terminal of the battery pack 31 are inserted, respectively. When the battery pack 31 is attached to the monitor apparatus 1, respective terminals of the battery terminal 35 are respectively brought in contact with predetermined terminals of a battery terminal board 36 which is used to electrically contact with the battery pack 31 provided on the side of the monitor apparatus 1.

The battery compartment member 32 has hinge mechanisms provided at both of right and left sides thereof. As shown in FIG. 11, movable members 41 and 42 are fixedly attached to the left and right sides of the battery pack compartment member 32 by fixing members 41*a*, 42*a* made of suitable means such as screws, respectively. Then, the movable members 41 and 42 and the fixing members 41*a* and 42*a* are coupled by the hinges 43 and 44, respectively, and thereby the movable members 41 and 42 can be moved along the circumferences while using the hinges 43 and 44 as the rotary shafts. As a consequence, the battery pack compartment member 32 can be opened and closed freely.

At that time, the hinge 43 is formed as a hollow hinge and thereby a wiring 47 is extended through the hole of this hinge 43 and connected to a main board (not shown) which controls the monitor apparatus 1. Since the wiring 47 is extended through the hole of the hinge 43 and connected to the main board, even when the battery pack compartment member 32 is opened and closed, the connection between the main board and the battery pack 31 can be maintained.

Figure 12B:
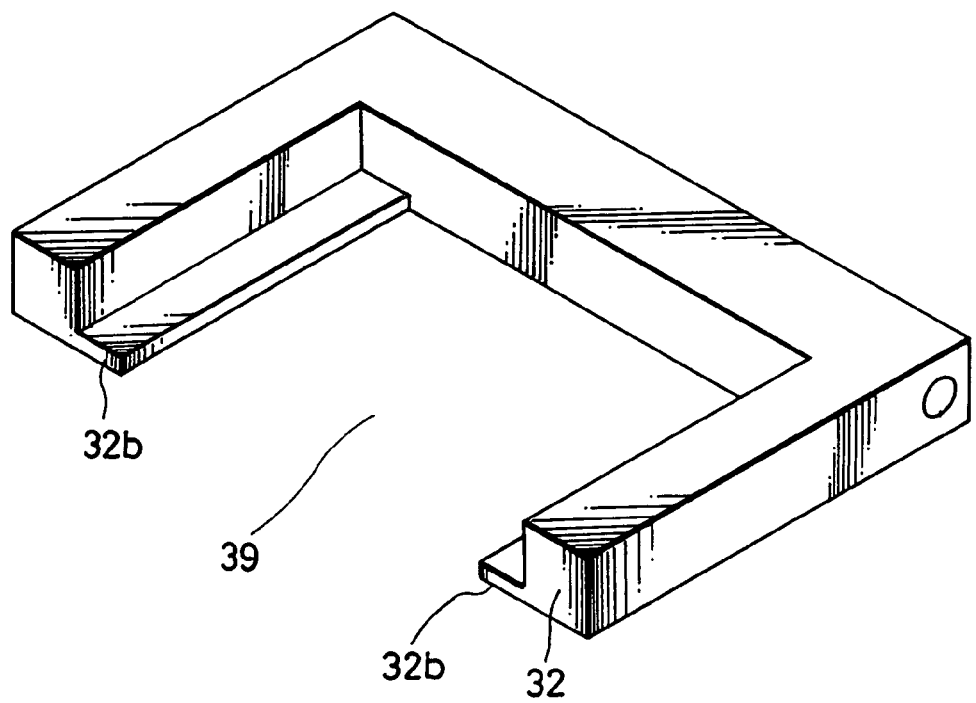

FIGS. 12A and 12B are perspective views to which reference will be made in explaining the shape of the battery pack compartment groove portion of the battery pack compartment member 32, respectively. In FIG. 12A, reference numeral 32*a* denotes a battery pack receiving portion on which the battery pack 31 is to be held when the battery pack 31 is accommodated into the battery pack compartment member 32.

Moreover, the battery pack compartment groove portion 38, for example, has guide grooves 40 curved at a right angle on one side wall thereof and the battery pack 31 has protruded portions (not shown) having predetermined shapes corresponding to the guide grooves 40 formed on one side wall thereof. With this arrangement, when the battery pack 31 is accommodated into the battery pack compartment member 32, the guide grooves 40 and the protruded portions are slidably engaged with each other, whereby the battery pack 31 can smoothly be accommodated into the battery pack compartment member 32, the battery pack 31 can stably be accommodated into the battery pack compartment member 32 and the battery pack 31 can be prevented from being moved uselessly within the battery pack compartment member 32. The shapes of the guide grooves 40 and the protruded portions are well known and are not limited to the above-mentioned examples and various arrangements and modifications thereof may be considered.

Moreover, if the above-mentioned battery pack receiving portion 32a is provided with lattice-like holes (not shown) properly, then the battery pack 31 can be exposed to the air through these lattice-like holes on the surface of the side in which the battery pack 31 contacts with the battery pack receiving portion 32a. Thus, when the battery built-in type stand 30 is opened, both of the upper and lower surfaces of the battery pack 31 can be exposed to the air and hence higher heat transferring effect can be expected.

FIG. 12B is a perspective view showing a part of improvement of the battery pack compartment member 32. Elements and parts identical to those of FIG. 12A, e.g. lock lever 34, holes 34a, 36a, guide groove 40 and the like are not shown in FIG. 12B. In FIG. 12B, the battery pack receiving portion 32a is largely recessed and thereby battery pack receiving portions 32b, 32b are formed.

With this arrangement, when the battery pack 31 is accommodated into the battery pack compartment member 32 and the battery built-in type stand 30 is opened to enable the monitor apparatus 1 to rise to the erect position, as shown in FIG. 7, both of the upper and lower surfaces of the package of the battery pack 31 can be exposed to the air and hence heat transferring effect can be improved much more.

Figure 13A:
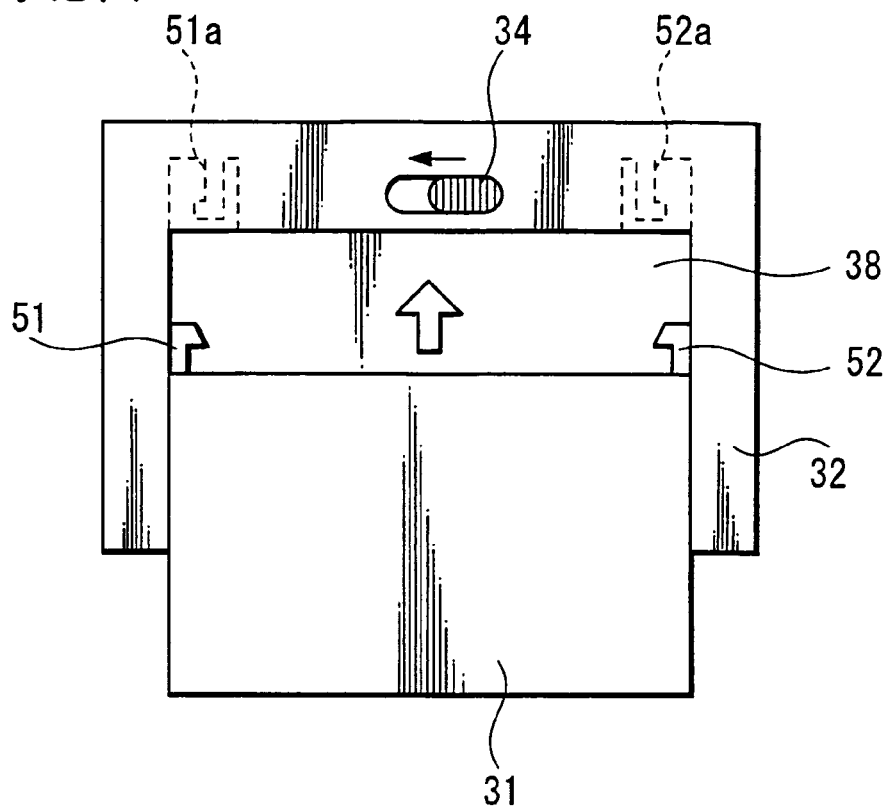
FIGS. 13A and 13B are diagrams to which reference will be made in explaining a method of attaching the battery pack compartment member to the battery pack, respectively.
Figure 13B:
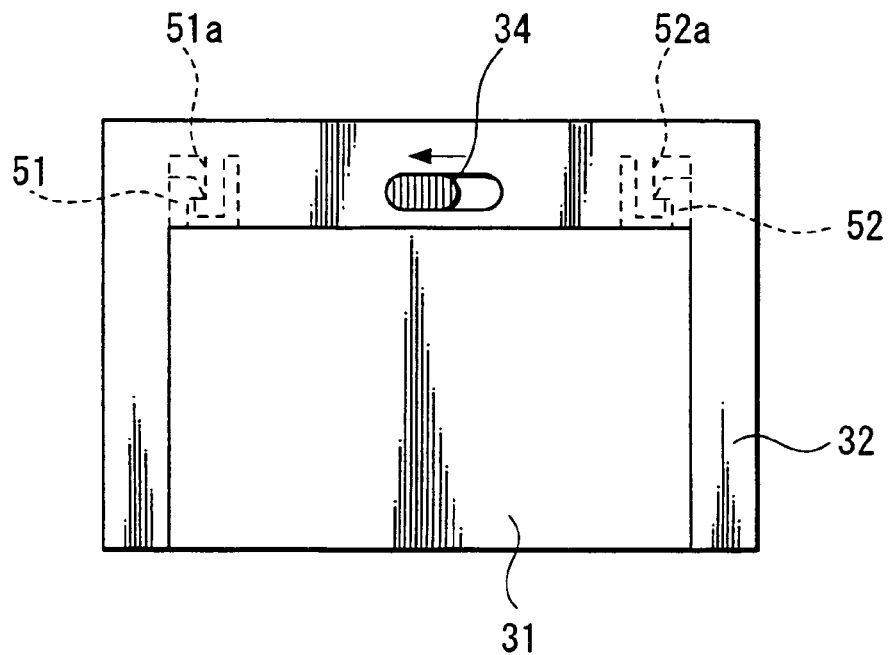

FIGS. 13A and 13B show an example of a manner in which the battery pack 31 is accommodated into the battery pack compartment member 32 and fixed thereto. FIG. 13A shows the state in which the battery pack 31 is being accommodated in somewhere of the battery pack compartment 32, and FIG. 13B shows the state in which the battery pack 31 has already been accommodated into the battery pack compartment member 32.

As shown in FIG. 13A, the battery pack 31 has hooked engagement protrusions 51 and 52 provided on one side walls along the direction in which the battery pack is to be inserted. The battery pack compartment member 32 has hooked engagement portions 51a and 52 at its portions corresponding to the engagement protrusions 51 and 52 provided on the above-described battery pack 31. The engagement portions 51a and 52a have resilient force and hence can move in the lateral direction in the sheet of drawing in FIG. 13A with application of external force.

The battery pack 31 is inserted into the battery pack compartment groove portion 38 of the battery pack compartment member 32 with the surfaces having the engagement protrusions 51 and 52 facing up. When the engagement protrusions 51 and 52 are inserted into recesses (shown by phantoms) formed in the engagement portions 51a and 52a of the battery pack compartment member 32 and are brought in contact with the engagement portions 51a and 52a, the engagement portions 51a and 52a are contacted with the engagement protrusions 51 and 52 and are thereby escaped to the lateral directions, respectively.

When the battery pack 31 is further inserted into the battery pack compartment member 32, as shown in FIG. 13A, the engagement protrusions 51 and 52 and the engagement portions 51a and 52a engage with each other to fix the battery pack 31 to the battery pack compartment member 32. At that time, if the lock lever 34, for example, is slid in the lock side, then the user can easily confirm the locked state of the battery pack 31 visually.

When the battery pack 31 is detached from the battery pack compartment member 32, the user manually slides the lock lever 34 to the lock releasing direction to move the engagement portions 51a and 52a to thereby detach the battery pack 31 from the battery pack compartment member 32. Since it is sufficient that these lock mechanisms can fix the battery pack, these lock mechanisms are not limited to the above-mentioned examples and can take various arrangements and modifications by using well-known technologies.

As described above, according to this embodiment, since the battery pack 31 and the battery pack compartment member 32 constitute the battery built-in type stand 30 to enable the battery pack 31 to rotate freely so as to become openable and closable, while the monitor apparatus 1 can stably rise to the erect position, the package of the battery pack 31 can directly be exposed to the air and heat transferring effect of the batteries of the monitor apparatus 1 having the display such as the LCD 2 for making wireless communication can be improved. It will be easily understood that similar action and effects to those of the example shown in FIG. 6 can be achieved.

The present invention is not limited to the above-mentioned embodiments and can take various modifications such as a mobile phone, a personal digital assistant and a television receiver having a flat-panel display having a thin housing structure to be driven by batteries in which the monitor apparatus 1 having the display screen and the base apparatus 200 for carrying out information processing or data communication with external devices.

As described above, according to the present invention, sine the battery pack of the information terminal apparatus having the thin housing structure is used as the stand that can freely rotate so as to become openable and closable or used as a part of such stand to enable the display to rise to the erect position, while the display can stably rise to the erect position, the package of the battery pack can directly be exposed to the air. There is then the advantage that heat transferring property can be improved.

Since the battery pack is used as the stand or a part of the stand to improve heat transferring effect, reduction of a time period during which the battery can be used (i.e., deterioration of battery) can be suppressed considerably, which can contribute to higher performance, high-speed operation, data processing of a large amount of data, and energy-saving property and miniaturization of the information terminal apparatus.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An information terminal apparatus having a thin housing structure including at least a display, said information terminal apparatus being driven by batteries, the information terminal apparatus comprising:

a battery pack for accommodating therein said batteries, said battery pack including a front surface facing a direction of the thin housing, a back surface facing away from the thin housing, and a rotary support mechanism for attaching and rotating said battery pack at an intermediate portion of a rear wall side of said display such that said battery pack becomes freely openable and closable from a lower portion of a rear wall side of said display, wherein said rotated battery pack is used as a stand to enable said display to rise to the erect position and said front and back surface of said battery pack are directly exposed to air; and a battery pack storage chamber within the thin housing structure and configured to receive the battery pack when the battery pack is not used as a stand.

2. An information terminal apparatus according to claim 1, wherein said information terminal apparatus comprises a base device including wireless communication means and wireless communication means capable of making wireless communication including reception of image data information.

3. In an information terminal apparatus having a thin housing structure including at least a display, said information terminal apparatus being driven by batteries, an information terminal apparatus comprising:
 a battery pack compartment member to which a battery pack to accommodate therein said batteries is detachably attached, said battery pack compartment member including a front surface facing a direction of the thin housing, a back surface facing away from the thin housing, and a rotary support mechanism for attaching and rotating said battery pack compartment member about an intermediate portion of the a rear wall side of said display so that said battery pack compartment member becomes freely openable and closable from a lower portion of the rear wall side of said display, wherein said rotated battery pack compartment member is used as a stand formed as one body with said battery pack to enable said display to rise to the erect position and said battery pack is directly exposed to air; and
 a battery pack storage chamber within the thin housing structure and configured to receive the battery pack when the battery pack is not used as a stand.

4. An information terminal apparatus according to claim 3, wherein said battery pack includes first connection means for making electrical connection with engagement means and said battery pack compartment member includes fixing means for fixing said engagement means when said battery pack is attached thereto and second connection means connected to said first connection means to make electrical connection with said first connection means when said battery pack is attached thereto.

5. An information terminal apparatus according to claim 4, wherein said information terminal apparatus comprises a base device including wireless communication means and wireless communication means capable of making wireless communication including reception of image data information.

* * * * *